US009250824B2

United States Patent
Qin

(10) Patent No.: US 9,250,824 B2
(45) Date of Patent: Feb. 2, 2016

(54) BACKING UP METHOD, DEVICE, AND SYSTEM FOR VIRTUAL MACHINE

(71) Applicant: Huawei Technologies Co., Ltd., Shenzhen (CN)

(72) Inventor: Zufu Qin, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 103 days.

(21) Appl. No.: 14/062,669

(22) Filed: Oct. 24, 2013

(65) Prior Publication Data

US 2014/0136803 A1 May 15, 2014

(30) Foreign Application Priority Data

Nov. 12, 2012 (CN) .......................... 2012 1 0450164

(51) Int. Cl.
*G06F 3/00* (2006.01)
*G06F 12/00* (2006.01)
*G06F 3/06* (2006.01)
*G06F 11/14* (2006.01)

(52) U.S. Cl.
CPC .............. *G06F 3/065* (2013.01); *G06F 3/0604* (2013.01); *G06F 3/0683* (2013.01); *G06F 11/1451* (2013.01); *G06F 11/1456* (2013.01); *G06F 11/1458* (2013.01)

(58) Field of Classification Search
None
See application file for complete search history.

(56) References Cited

U.S. PATENT DOCUMENTS 8,117,410 B2 * 2/2012 Lu et al. ........................ 711/162
2010/0011178 A1 1/2010 Feathergill
2011/0252208 A1 10/2011 Ali

OTHER PUBLICATIONS

"Extended European Search Report," Application No. 13191629.8, Applicant: Huawei Technologies Co., Ltd., mailing date: Feb. 24, 2014, 10 pages.

* cited by examiner

*Primary Examiner* — Idriss N Alrobaye
*Assistant Examiner* — Richard B Franklin
(74) *Attorney, Agent, or Firm* — Slater & Matsil, L.L.P.

(57) ABSTRACT

Embodiments of the present disclosure provide a backing up method, device, and system for a virtual machine. The backing up method for a virtual machine includes a backup server mounting a snapshot initial volume of a to-be-backed-up original volume of a virtual machine in a primary storage device to the backup server, creating an initialization backup volume on a backup storage device and mounting the initialization backup volume to the backup server, and backing up an original data block of the original volume to the initialization backup volume.

14 Claims, 7 Drawing Sheets

Figure 2B:
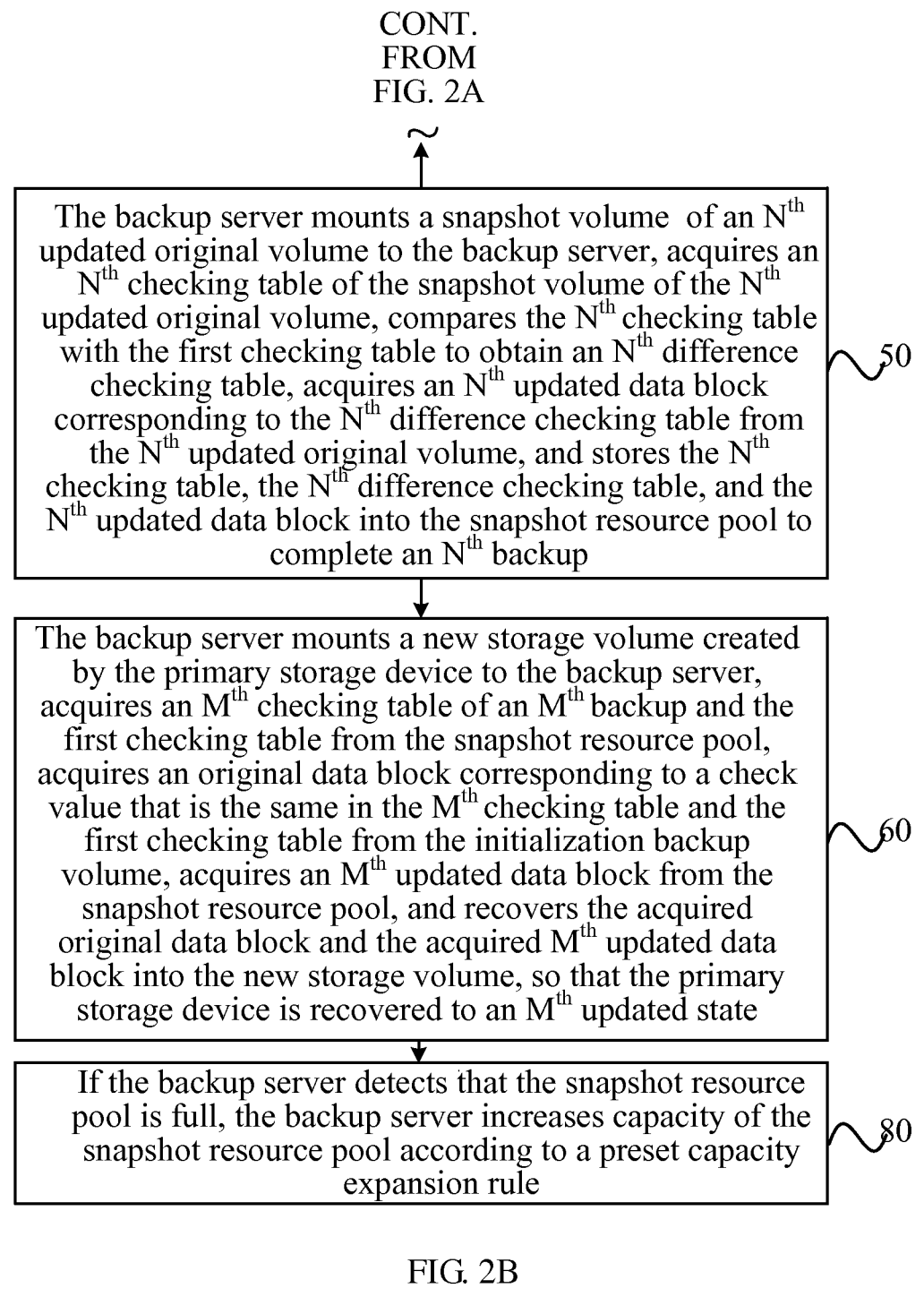

CONT. FROM FIG. 2A

The backup server mounts a snapshot volume of an $N^{th}$ updated original volume to the backup server, acquires an $N^{th}$ checking table of the snapshot volume of the $N^{th}$ updated original volume, compares the $N^{th}$ checking table with the first checking table to obtain an $N^{th}$ difference checking table, acquires an $N^{th}$ updated data block corresponding to the $N^{th}$ difference checking table from the $N^{th}$ updated original volume, and stores the $N^{th}$ checking table, the $N^{th}$ difference checking table, and the $N^{th}$ updated data block into the snapshot resource pool to complete an $N^{th}$ backup

50

The backup server mounts a new storage volume created by the primary storage device to the backup server, acquires an $M^{th}$ checking table of an $M^{th}$ backup and the first checking table from the snapshot resource pool, acquires an original data block corresponding to a check value that is the same in the $M^{th}$ checking table and the first checking table from the initialization backup volume, acquires an $M^{th}$ updated data block from the snapshot resource pool, and recovers the acquired original data block and the acquired $M^{th}$ updated data block into the new storage volume, so that the primary storage device is recovered to an $M^{th}$ updated state

60

If the backup server detects that the snapshot resource pool is full, the backup server increases capacity of the snapshot resource pool according to a preset capacity expansion rule

Figure 3B:
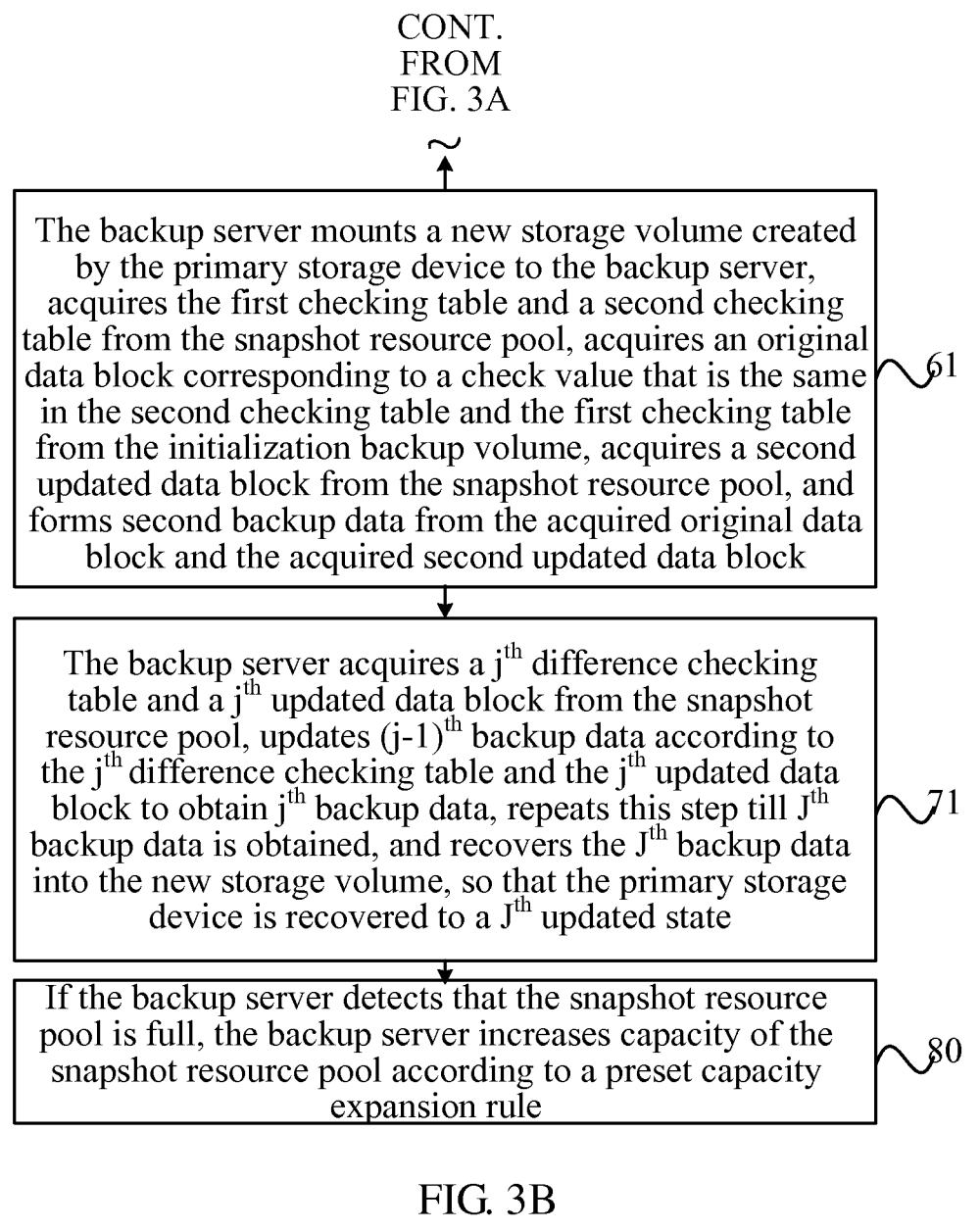

CONT. FROM FIG. 3A

The backup server mounts a new storage volume created by the primary storage device to the backup server, acquires the first checking table and a second checking table from the snapshot resource pool, acquires an original data block corresponding to a check value that is the same in the second checking table and the first checking table from the initialization backup volume, acquires a second updated data block from the snapshot resource pool, and forms second backup data from the acquired original data block and the acquired second updated data block

61

The backup server acquires a $j^{th}$ difference checking table and a $j^{th}$ updated data block from the snapshot resource pool, updates $(j-1)^{th}$ backup data according to the $j^{th}$ difference checking table and the $j^{th}$ updated data block to obtain $j^{th}$ backup data, repeats this step till $J^{th}$ backup data is obtained, and recovers the $J^{th}$ backup data into the new storage volume, so that the primary storage device is recovered to a $J^{th}$ updated state

71

If the backup server detects that the snapshot resource pool is full, the backup server increases capacity of the snapshot resource pool according to a preset capacity expansion rule

BACKING UP METHOD, DEVICE, AND SYSTEM FOR VIRTUAL MACHINE

CROSS-REFERENCE TO RELATED APPLICATIONS

This application claims priority to Chinese Patent Application No. 201210450164.5, filed on Nov. 12, 2012, which is hereby incorporated by reference in its entirety.

TECHNICAL FIELD

Embodiments of the present disclosure relate to data processing technologies, and in particular to a backing up method, device, and system for a virtual machine.

BACKGROUND

With development of computer technologies, virtualization technologies are widely promoted and applied. Multiple virtual machines may be created on a physical machine by using a virtualization technology to form a virtualization platform and the multiple virtual machines share a physical resource; and for a user, these virtual machines work like real computers completely.

Data of a virtual machine is saved on a bottom storage device, and to ensure reliability of the data of the virtual machine, the data of the virtual machine generally needs to be backed up. In the prior art, for a virtualization platform that supports a cluster file system, a backup of data of a virtual machine may be implemented through an image of the cluster file system or in a storage live migration manner. However, in the backup process, processor and memory resources of the virtualization platform are both greatly consumed, thereby affecting performance of an upper application of the virtual machine.

SUMMARY

Embodiments of the present disclosure provide a backing up method, device, and system for a virtual machine, so as to reduce occupation of a virtualization platform resource in a backup process and improve backup efficiency of a virtual machine.

In a first aspect, an embodiment of the present disclosure provides a backing up method for a virtual machine, including:

mounting, by a backup server, a snapshot initial volume of a to-be-backed-up original volume of a virtual machine in a primary storage device to the backup server;

creating, by the backup server, an initialization backup volume on a backup storage device, and mounting the initialization backup volume to the backup server; and backing up, by the backup server, an original data block of the original volume to the initialization backup volume.

In a first possible implementation manner, after the mounting, by a backup server, a snapshot initial volume of a to-be-backed-up original volume of a virtual machine in a primary storage device to the backup server, the method further includes:

creating, by the backup server, a snapshot resource pool on the backup storage device, mounting the snapshot resource pool to the backup server, acquiring a first checking table of the snapshot initial volume, and storing the first checking table into the snapshot resource pool, where the first checking table is used to record a check value of each original data block in the original volume; and after the backing up, by the backup server, an original data block of the original volume to the initialization backup volume, the method further includes:

mounting, by the backup server, a snapshot volume of an $N^{th}$ updated original volume to the backup server, acquiring an $N^{th}$ checking table of the snapshot volume of the $N^{th}$ updated original volume, comparing the $N^{th}$ checking table with the first checking table to obtain an $N^{th}$ difference checking table, acquiring an $N^{th}$ updated data block corresponding to the $N^{th}$ difference checking table from the $N^{th}$ updated original volume, and storing the $N^{th}$ checking table, the $N^{th}$ difference checking table, and the $N^{th}$ updated data block into the snapshot resource pool to complete an $N^{th}$ backup, where N is an integer and N>1, the $N^{th}$ checking table is used to record a check value of each data block in the $N^{th}$ updated original volume, and the $N^{th}$ difference checking table is used to record a check value that differs in the $N^{th}$ checking table and the first checking table.

According to the first possible implementation manner of the first aspect, in a second possible implementation manner, the method further includes:

mounting, by the backup server, a new storage volume created by the primary storage device to the backup server, acquiring an $M^{th}$ checking table of an $M^{th}$ backup and the first checking table from the snapshot resource pool, acquiring an original data block corresponding to a check value that is the same in the $M^{th}$ checking table and the first checking table from the initialization backup volume, acquiring an $M^{th}$ updated data block from the snapshot resource pool, and recovering the acquired original data block and the acquired $M^{th}$ updated data block into the new storage volume, so that the primary storage device is recovered to an $M^{th}$ updated state, where M is an integer and $1<M\leq N$.

In a third possible implementation manner, after the mounting, by a backup server, a snapshot initial volume of a to-be-backed-up original volume of a virtual machine in a primary storage device to the backup server, the method further includes:

creating, by the backup server, a snapshot resource pool on the backup storage device, mounting the snapshot resource pool to the backup server, acquiring a first checking table of the snapshot initial volume, and storing the first checking table into the snapshot resource pool, where the first checking table is used to record a check value of each original data block in the original volume; and after the backing up, by the backup server, an original data block of the original volume to the initialization backup volume, the method further includes:

mounting, by the backup server, a snapshot volume of an $I^{th}$ updated original volume to the backup server, acquiring an $I^{th}$ checking table of the snapshot volume of the $I^{th}$ updated original volume, comparing the $I^{th}$ checking table with an $(I-1)^{th}$ checking table to obtain an $I^{th}$ difference checking table, acquiring an $I^{th}$ updated data block corresponding to the $I^{th}$ difference checking table from the $I^{th}$ updated original volume, and storing the $I^{th}$ checking table, the $I^{th}$ difference checking table, and the $I^{th}$ updated data block into the snapshot resource pool to complete an $I^{th}$ backup, where I is an integer and I>1, the $I^{th}$ checking table is used to record a check value of each data block in the $I^{th}$ updated original volume, and the $I^{th}$ difference checking table is used to record a check value that differs in the $I^{th}$ checking table and the $(I-1)^{th}$ checking table.

According to the third possible implementation manner of the first aspect, in a fourth possible implementation manner, the method further includes:

mounting, by the backup server, a new storage volume created by the primary storage device to the backup server, acquiring the first checking table and a second checking table from the snapshot resource pool, acquiring an original data block corresponding to a check value that is the same in the second checking table and the first checking table from the initialization backup volume, acquiring a second updated data block from the snapshot resource pool, and forming second backup data from the acquired original data block and the acquired second updated data block; and acquiring, by the backup server, a $j^{th}$ difference checking table and a $j^{th}$ updated data block from the snapshot resource pool, updating $(j-1)^{th}$ backup data according to the $j^{th}$ difference checking table and the $j^{th}$ updated data block to obtain $j^{th}$ backup data, repeating this step till $J^{th}$ backup data is obtained, and recovering the $J^{th}$ backup data into the new storage volume, so that the primary storage device is recovered to a $J^{th}$ updated state, where J is an integer, $2<J\leq S$, j is an integer, and $2<j\leq J$.

According to the first or the third possible implementation manner of the first aspect, in a fifth possible implementation manner, the method further includes:

increasing capacity of the snapshot resource pool according to a preset capacity expansion rule if the backup server detects that the snapshot resource pool is full.

In a sixth possible implementation manner, after the backing up, by the backup server, an original data block of the original volume to the initialization backup volume, the method further includes:

unmounting, by the backup server, the snapshot initial volume.

According to the first or the third possible implementation manner of the first aspect, in a seventh possible implementation manner, the first checking table is a message-digest algorithm MD5 checking table.

In a second aspect, an embodiment of the present disclosure provides a backup server, including:

a first processing unit, configured to mount a snapshot initial volume of a to-be-backed-up original volume of a virtual machine in a primary storage device to the backup server;

a second processing unit, configured to create an initialization backup volume on a backup storage device, and mount the initialization backup volume to the backup server; and an initial backup unit, configured to back up an original data block of the original volume to the initialization backup volume.

In a first possible implementation manner, the backup server further includes:

a third processing unit, configured to create a snapshot resource pool on the backup storage device, mount the snapshot resource pool to the backup server, acquire a first checking table of the snapshot initial volume, and store the first checking table into the snapshot resource pool, where the first checking table is used to record a check value of each original data block in the original volume; and a first update backup unit, configured to mount a snapshot volume of an $N^{th}$ updated original volume to the backup server, acquire an $N^{th}$ checking table of the snapshot volume of the $N^{th}$ updated original volume, compare the $N^{th}$ checking table with the first checking table to obtain an $N^{th}$ difference checking table, acquire an $N^{th}$ updated data block corresponding to the $N^{th}$ difference checking table from the $N^{th}$ updated original volume, and store the $N^{th}$ checking table, the $N^{th}$ difference checking table, and the $N^{th}$ updated data block into the snapshot resource pool to complete an $N^{th}$ backup, where N is an integer and $N>1$, the $N^{th}$ checking table is used to record a check value of each data block in the $N^{th}$ updated original volume, and the $N^{th}$ difference checking table is used to record a check value that differs in the $N^{th}$ checking table and the first checking table.

According to the first possible implementation manner of the second aspect, in a second possible implementation manner, the backup server further includes:

a first recovering unit, configured to mount a new storage volume created by the primary storage device to the backup server, acquire an $M^{th}$ checking table of an $M^{th}$ backup and the first checking table from the snapshot resource pool, acquire an original data block corresponding to a check value that is the same in the $M^{th}$ checking table and the first checking table from the initialization backup volume, acquire an $M^{th}$ updated data block from the snapshot resource pool, and recover the acquired original data block and the acquired $M^{th}$ updated data block into the new storage volume, so that the primary storage device is recovered to an $M^{th}$ updated state, where M is an integer and $1<M\leq N$.

In a third possible implementation manner, the backup server further includes:

a fourth processing unit, configured to create a snapshot resource pool on the backup storage device, mount the snapshot resource pool to the backup server, acquire a first checking table of the snapshot initial volume, and store the first checking table into the snapshot resource pool, where the first checking table is used to record a check value of each original data block in the original volume; and a second update backup unit, configured to mount a snapshot volume of an $I^{th}$ updated original volume to the backup server, acquire an $I^{th}$ checking table of the snapshot volume of the $I^{th}$ updated original volume, compare the $I^{th}$ checking table with an $(I-1)^{th}$ checking table to obtain an $I^{th}$ difference checking table, acquire an $I^{th}$ updated data block corresponding to the $I^{th}$ difference checking table from the $I^{th}$ updated original volume, and store the $I^{th}$ checking table, the $I^{th}$ difference checking table, and the $I^{th}$ updated data block into the snapshot resource pool to complete an $I^{th}$ backup, where I is an integer and $I>1$, the $I^{th}$ checking table is used to record a check value of each data block in the $I^{th}$ updated original volume, and the $I^{th}$ difference checking table is used to record a check value that differs in the $I^{th}$ checking table and the $(I-1)^{th}$ checking table.

According to the third possible implementation manner of the second aspect, in a fourth possible implementation manner, the backup server further includes:

a second recovering unit, configured to mount a new storage volume created by the primary storage device to the backup server, acquire the first checking table and a second checking table from the snapshot resource pool, acquire an original data block corresponding to a check value that is the same in the second checking table and the first checking table from the initialization backup volume, acquire a second updated data block from the snapshot resource pool, and form second backup data from the acquired original data block and the acquired second updated data block; and acquire a $j^{th}$ difference checking table and a $j^{th}$ updated data block from the snapshot resource pool, update $(j-1)^{th}$ backup data according to the $j^{th}$ difference checking table and the $j^{th}$ updated data block to obtain $j^{th}$ backup data, repeat this step till $J^{th}$ backup data is obtained, and recover the $J^{th}$ backup data into the new storage volume, so that the primary storage device is recovered to a $J^{th}$ updated state, where J is an integer, $2<J\leq S$, j is an integer, and $2<j\leq J$.

According to the first or the third possible implementation manner of the second aspect, in a fifth possible implementation manner, the backup server further includes:

a capacity expansion unit, configured to increase capacity of the snapshot resource pool according to a preset capacity expansion rule if it is detected that the snapshot resource pool is full.

In a sixth possible implementation manner, the backup server further includes:

an unmounting unit, configured to unmount the snapshot initial volume.

In a third aspect, an embodiment of the present disclosure provides a backing up system for a virtual machine, including a primary storage device and a backup storage device, and further including:

a backup server provided in the embodiments of the present disclosure.

It can be seen from the foregoing technical solutions that, with the backing up method, device, and system for a virtual machine provided in the embodiments of the present disclosure, a backup server mounts a snapshot initial volume of a to-be-backed-up original volume of a virtual machine in a primary storage device to the backup server, creates an initialization backup volume on a backup storage device, mounts the initialization backup volume to the backup server, and backs up an original data block of the original volume to the initialization backup volume. Backup processing for a virtual machine is implemented by a backup server, thereby reducing occupation of a virtualization platform resource including primary storage in a backup process, saving space of a backup disk, and improving backup efficiency of the virtual machine at the same time.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

FIG. 2A and FIG. 2B are a is a flowchart of a second backing up method for a virtual machine according to an embodiment of the present disclosure;

DESCRIPTION OF EMBODIMENTS

To make the objectives, technical solutions, and advantages of the embodiments of the present disclosure more comprehensible, the following clearly describes the technical solutions in the embodiments of the present disclosure with reference to the accompanying drawings in the embodiments of the present disclosure. Apparently, the embodiments to be described are merely a part rather than all of the embodiments of the present disclosure. All other embodiments obtained by persons of ordinary skill in the art based on the embodiments of the present disclosure without creative efforts shall fall within the protection scope of the present disclosure.

Figure 1:
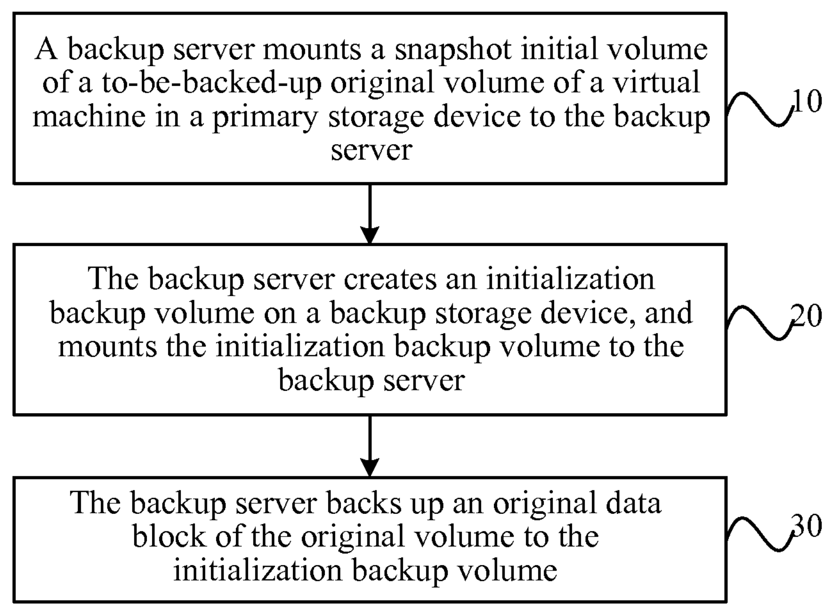
FIG. 1 is a flowchart of a first backing up method for a virtual machine according to an embodiment of the present disclosure.

FIG. 1 is a flowchart of a first backing up method for a virtual machine according to an embodiment of the present disclosure. As shown in FIG. 1, the backing up method for a virtual machine provided in this embodiment may specifically apply to a backing up process for a virtual machine in a virtualization platform, and a backup for a virtual machine may be a backup for a system volume and/or a data volume of the virtual machine. The backing up method for a virtual machine provided in this embodiment may be performed by a backup server, and the backup server may be a device with a processing capability, such as a personal computer, a notebook computer, and a server.

The backing up method for a virtual machine provided in this embodiment specifically includes:

Step 10: A backup server mounts a snapshot initial volume of a to-be-backed-up original volume of a virtual machine in a primary storage device to the backup server.

Step 20: The backup server creates an initialization backup volume on a backup storage device, and mounts the initialization backup volume to the backup server.

Step 30: The backup server backs up an original data block of the original volume to the initialization backup volume.

Specifically, multiple virtual machines are set in a virtualization platform and the primary storage device allocates a storage resource for each virtual machine, where the storage resource may include a system volume and a data volume, a to-be-backed-up original volume of a virtual machine is specifically a storage volume that does not undergo any backup processing, and data in the original volume may be divided into data blocks of the same size according to a preset rule. The original volume may be a system volume and/or a data volume, and a storage volume that needs to be backed up may be selected according to a preset backup policy.

In a practical application, a storage underlying drive such as an iSCSI (internet Small Computer System Interface, internet small computer system interface) initiator (initiator) drive may be preinstalled in the backup server; and storage client software and backup management software may also be installed in the backup server, so as to implement backup processing and management for a virtual machine by using the storage client software and the backup management software. A structure of the backup server may include a link layer, a driver layer, an operating system layer, and an application layer. The link layer is mainly embodied as a hardware layer, such as a network card and an HBA (host bus adaptor, Host Bus Adaptor) card (an iSCSI HBA card or a FC HBA card); the driver layer mainly provides underlying drive for the network card or the HBA card of the hardware layer; the operating system layer mainly provides an operating system platform used to support an upper application; and the application layer includes two parts: the backup management software and the storage client software, where a major function of the backup management software is to provide backup policy configuration and data recovery, and a major function of the storage client software is to communicate with primary storage and backup storage, and interactively implement some functions of the storage volume, such as disk mounting, disk unmounting, and disk capacity expansion.

The primary storage device may perform an initialization snapshot operation on the to-be-backed-up original volume of the virtual machine to generate a snapshot initial volume. The backup server may also perform a snapshot operation on the original volume of the primary storage device through an interface with the primary storage device and by using an underlying command to generate the snapshot initial volume. The backup server mounts the snapshot initial volume to the backup server, and the backup server may identify a new disk such as an LUN1 through scanning performed by a disk drive.

The backup server creates an initialization backup volume on a backup storage device and mounts the initialization backup volume to the backup server, and the backup server may identify a new disk such as an LUN2 through scanning performed by the disk drive. There may be multiple initialization backup volumes, and an initialization backup volume may be selected as a backup destination volume according to a preset backup policy.

The backup server acquires all original data blocks in the original volume from the primary storage device according to the mounted snapshot initial volume, backs up the original data blocks to the initialization backup volume, so as to implement an initialization backup of the original volume of the virtual machine. For ease of description, the initialization backup is used as first backup.

It should be noted that there is no necessary time sequence between step 10 and step 20, and they may be processed sequentially, or may be processed in parallel, which is not limited in this embodiment.

With the backing up method for a virtual machine provided in this embodiment, a backup server mounts a snapshot initial volume of a to-be-backed-up original volume of a virtual machine in a primary storage device to the backup server, creates an initialization backup volume on a backup storage device, mounts the initialization backup volume to the backup server, and backs up an original data block of the original volume to the initialization backup volume. Backup processing for a virtual machine is implemented by a backup server, thereby reducing occupation of a virtualization platform resource including primary storage in a backup process, saving space of a backup disk, and improving backup efficiency of the virtual machine at the same time.

After the initialization backup is performed on the virtual machine, the virtual machine performs update operations, such as adding, deleting, and modifying, on data in a system volume and a data volume in a running process; therefore, the data in the system volume and the data volume is continuously updated. After the backup server performs the initialization backup on the virtual machine, an incremental backup may be performed, and there may be multiple implementation manners of the incremental backup.

Figure 2A:
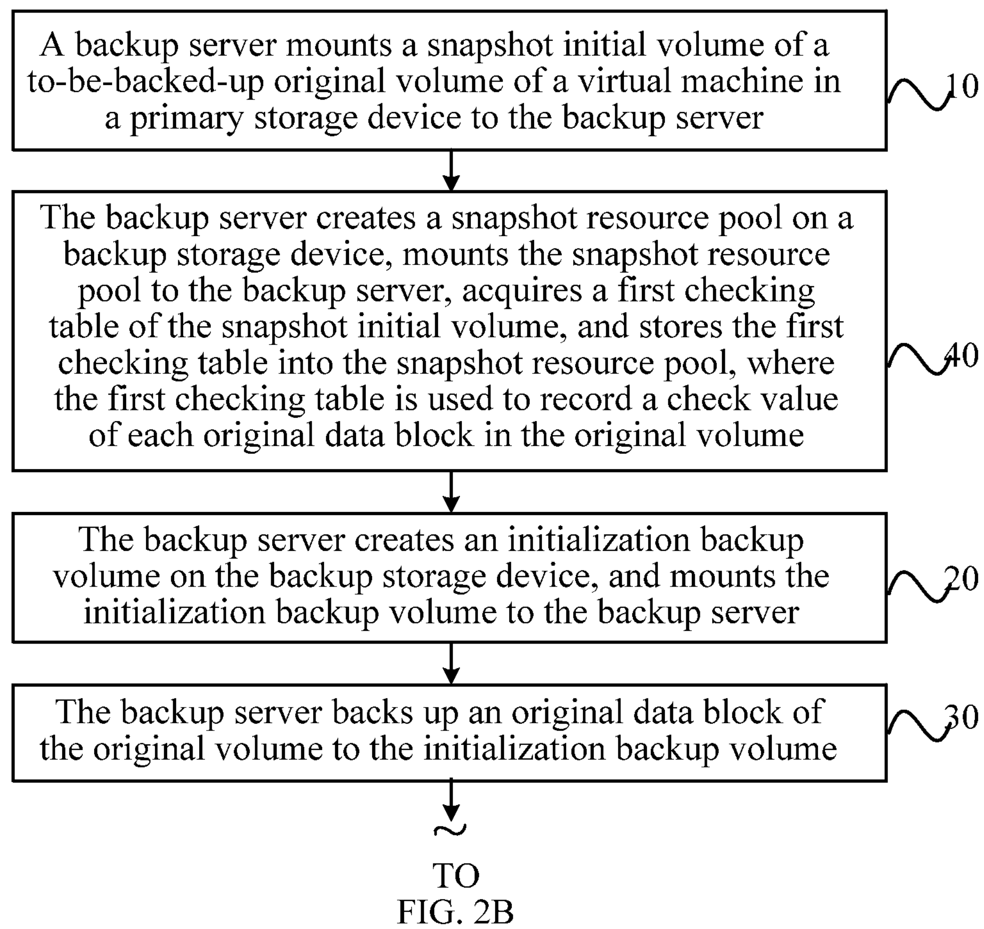

FIG. 2A and FIG. 2B are a flowchart of a second backing up method for a virtual machine according to an embodiment of the present disclosure. As shown in FIG. 2A and FIG. 2B, in an implementation manner, after the backup server mounts a snapshot initial volume of a to-be-backed-up original volume of a virtual machine in a primary storage device to the backup server in step 10, the method further includes:

Step 40: The backup server creates a snapshot resource pool on a backup storage device, mounts the snapshot resource pool to the backup server, acquires a first checking table of the snapshot initial volume, and stores the first checking table into the snapshot resource pool, where the first checking table is used to record a check value of each original data block in the original volume.

Specifically, there is no necessary time sequence between step 40 and step 20 either, they may be processed sequentially, or may be processed in parallel, which is not limited in this embodiment. The backup server creates a snapshot resource pool on a backup storage device, and the snapshot resource pool may be specifically implemented in the form of creating a storage volume with preset capacity. The backup server mounts the snapshot initial volume to the backup server, and the backup server may identify a new disk such as an LUN3 through scanning performed by a disk drive. The backup server acquires a first checking table corresponding to the snapshot initial volume, and the first checking table is used to record a check value of each original data block in the original volume. The primary storage device may perform processing on each original data block in the original volume to generate a check value of each original data block, so as to form the first checking table, and the backup server acquires the first checking table from the primary storage device. The backup server may also perform processing on each original data block in the original volume to generate a check value of each original data block and form the first checking table. There are multiple methods for generating a check value, for example, an original data block may be processed by using a message-digest algorithm (Message-Digest Algorithm, MD for short) 5 to generate an MD5 check value, or an original data block may be processed by using a hash algorithm to generate a hash check value. If the MD5 is used to process data, data in the original volume may be divided into multiple data blocks, and a size of each data block may be 64 M, or may be set to another value.

After the backup server backs up an original data block of the original volume to the initialization backup volume in step 30, the method further includes:

Step 50: The backup server mounts a snapshot volume of an $N^{th}$ updated original volume to the backup server, acquires an $N^{th}$ checking table of the snapshot volume of the $N^{th}$ updated original volume, compares the $N^{th}$ checking table with the first checking table to obtain an $N^{th}$ difference checking table, acquires an $N^{th}$ updated data block corresponding to the $N^{th}$ difference checking table from the $N^{th}$ updated original volume, and stores the $N^{th}$ checking table, the $N^{th}$ difference checking table, and the $N^{th}$ updated data block into the snapshot resource pool to complete an $N^{th}$ backup, where N is an integer and N>1, the $N^{th}$ checking table is used to record a check value of each data block in the $N^{th}$ updated original volume, and the $N^{th}$ difference checking table is used to record a check value that differs in the $N^{th}$ checking table and the first checking table.

Specifically, for ease of description, an initialization process of the virtual machine may be used as a first update, that is, the original data block in the original volume is first updated data. After a first backup of the virtual machine and before a second backup of the virtual machine, an update operation on a data block in the original volume is a second update, and so on.

A generating process of the current snapshot volume is similar to a generating process of the snapshot initial volume, and a generating process of the $N^{th}$ checking table is similar to a generating process of the first checking table. For details, reference may be made to the description in the embodiment shown in FIG. 1, which are not described herein again. The $N^{th}$ checking table is compared with the first checking table. If a check value of a certain data block in the $N^{th}$ checking table is equal to a check value of a corresponding data block in the first checking table, it is indicated that after the $N^{th}$ update, the data block in the $N^{th}$ update original volume is the same as an initialized original data block. If a check value of a certain data block in the $N^{th}$ checking table is not equal to a check value of a corresponding data block in the first checking table, it is indicated that after the $N^{th}$ update, the data block in the $N^{th}$ update original volume is different from an initialized original data block. The check value that differs in the $N^{th}$ checking table and the first checking table is recorded in the $N^{th}$ difference checking table, and the $N^{th}$ updated data block corresponding to the $N^{th}$ difference checking table is acquired from the $N^{th}$ updated original volume. The $N^{th}$ checking table, the $N^{th}$ difference checking table, and the $N^{th}$ updated data block are stored into the snapshot resource pool. In a practical application process, a backup operation may be manually triggered by an administrator or may be triggered at a scheduled time. Each backup may be regarded as a backup point, and time information of the backup may be recorded to effectively perform corresponding data recovery.

An initialization backup for the virtual machine is a full backup, in a backup process after the initialization backup, it needs to store only a data block that differs in a current updated original volume and an original volume during initialization, and because only differentiated data is copied during the backup, an incremental backup is implemented, thereby greatly saving disk space and improving backup efficiency and accuracy.

In this embodiment, the method may further include:

Step 60: The backup server mounts a new storage volume created by the primary storage device to the backup server, acquires an $M^{th}$ checking table of an $M^{th}$ backup and the first checking table from the snapshot resource pool, acquires an original data block corresponding to a check value that is the same in the $M^{th}$ checking table and the first checking table from the initialization backup volume, acquires an $M^{th}$ updated data block from the snapshot resource pool, and recovers the acquired original data block and the acquired $M^{th}$ updated data block into the new storage volume, so that the primary storage device is recovered to an $M^{th}$ updated state, where M is an integer and $1<M\leq N$.

Specifically, after the primary storage device is faulty or data is lost, data recovery may be performed on the primary storage device through the backup storage device. A user may select a backup point (for example, the $M^{th}$ backup) to perform data recovery on the primary storage device, or may perform data recovery on the primary storage device according to data of a last backup (that is, the $N^{th}$ backup) by default. Because the original data block is stored in the initialization backup volume of the backup storage device, and each updated checking table and each updated data block that is different from the original data block are stored in the snapshot resource pool, data recovery may be performed on the primary storage device according to the initialization backup volume and the snapshot resource pool.

In this embodiment, further, the method may further include:

Step 80: If the backup server detects that the snapshot resource pool is full, the backup server increases capacity of the snapshot resource pool according to a preset capacity expansion rule.

Specifically, when the snapshot resource pool is created, the snapshot resource pool may be allocated relatively small capacity to avoid a waste of a resource. After multiple backups, if the capacity of the snapshot resource pool is insufficient, the capacity of the snapshot resource pool may be automatically expanded to adapt to a backup requirement and improve reliability of the backup.

In this embodiment, after the backup server backs up an original data block of the original volume to the initialization backup volume in step 20, the method further includes:

unmounting, by the backup server, the snapshot initial volume.

Specifically, after each backup, the backup server may unmount a current snapshot volume to avoid resource occupation due to excessive snapshot volumes that are mounted on the backup server.

In this embodiment, preferably, the first checking table is a message-digest algorithm MD5 checking table.

Figure 3A:
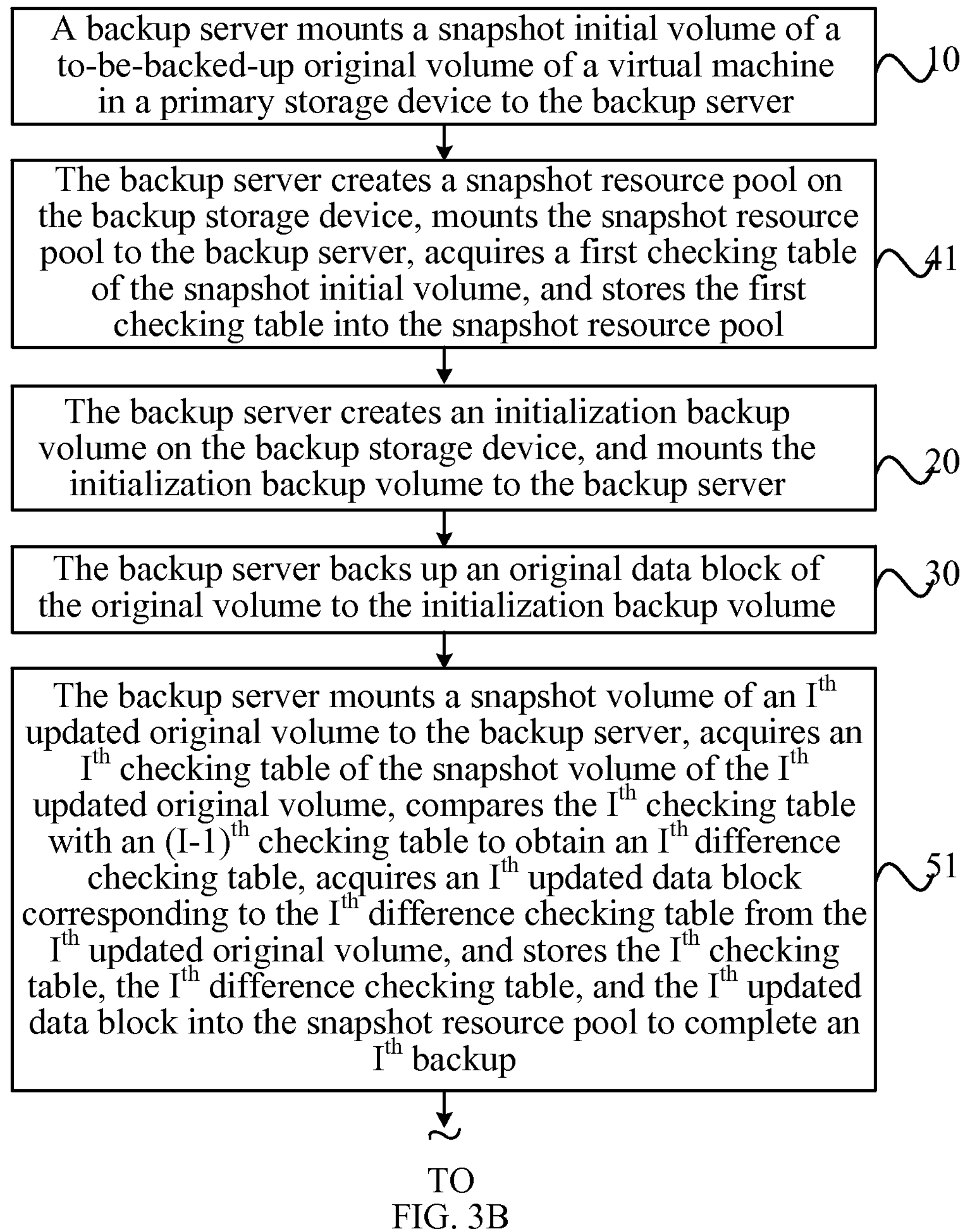
FIG. 3 is a flowchart of a third backing up method for a virtual machine according to an embodiment of the present disclosure.

FIG. 3 is a flowchart of a third backing up method for a virtual machine according to an embodiment of the present disclosure. As shown in FIG. 3, in another implementation manner, after the backup server mounts a snapshot initial volume of a to-be-backed-up original volume of a virtual machine in a primary storage device to the backup server in step 10, the method further includes:

Step 41: The backup server creates a snapshot resource pool on the backup storage device, mounts the snapshot resource pool to the backup server, acquires a first checking table of the snapshot initial volume, and stores the first checking table into the snapshot resource pool, where the first checking table is used to record a check value of each original data block in the original volume.

Specifically, there is no necessary time sequence between step 41 and step 20 either, they may be processed sequentially, or may be processed in parallel, which is not limited in this embodiment. The backup server creates a snapshot resource pool on a backup storage device, and the snapshot resource pool may be specifically implemented in the form of creating a storage volume with preset capacity. The backup server mounts the snapshot resource pool to the backup server, and the backup server may identify a new disk such as an LUN3 through scanning performed by a disk drive. The backup server acquires a first checking table corresponding to the snapshot initial volume, and the first checking table is used to record a check value of each original data block in the original volume. The primary storage device may perform processing on each original data block in the original volume to generate a check value of each original data block, so as to form the first checking table, and the backup server acquires the first checking table from the primary storage device. The backup server may also perform processing on each original data block in the original volume to generate a check value of each original data block and form the first checking table. There are multiple methods for generating a check value, for example, an original data block may be processed by using a message-digest algorithm (Message-Digest Algorithm, MD for short) 5 to generate an MD5 check value, or an original data block may be processed by using a hash algorithm to generate a hash check value.

After the backup server backs up an original data block of the original volume to the initialization backup volume in step 30, the method further includes:

Step 51: The backup server mounts a snapshot volume of an $I^{th}$ updated original volume to the backup server, acquires an $I^{th}$ checking table of the snapshot volume of the $I^{th}$ updated original volume, compares the $I^{th}$ checking table with an $(I-1)^{th}$ checking table to obtain an $I^{th}$ difference checking table, acquires an $I^{th}$ updated data block corresponding to the $I^{th}$ difference checking table from the $I^{th}$ updated original volume, and stores the $I^{th}$ checking table, the $I^{th}$ difference checking table, and the $I^{th}$ updated data block into the snapshot resource pool to complete an $I^{th}$ backup, where I is an integer and $I>1$, the $I^{th}$ checking table is used to record a check value of each data block in the $I^{th}$ updated original volume, and the $I^{th}$ difference checking table is used to record a check value that differs in the $I^{th}$ checking table and the $(I-1)^{th}$ checking table.

Specifically, a generating process of the current snapshot volume is similar to a generating process of the snapshot initial volume, and a generating process of the $I^{th}$ checking table is similar to a generating process of the first checking table. For details, reference may be made to the description in the embodiment shown in FIG. 1, which are not described herein again. The $I^{th}$ difference checking table corresponds to the $I^{th}$ updated original volume, and the $(I-1)^{th}$ difference checking table corresponds to an $(I-1)^{th}$ updated original volume. The $I^{th}$ difference checking table is compared with the $(I-1)^{th}$ difference checking table, and a data block corresponding to a check value that differs in the two is a data block updated during the $I^{th}$ update. The $I^{th}$ difference checking table that records a different check value and the $I^{th}$ updated data block are stored into the snapshot resource pool for data recovery. In a practical application process, a backup operation may be manually triggered by an administrator or may be triggered at a scheduled time. Each backup may be regarded as a backup point, and time information of the backup may be recorded to effectively perform corresponding data recovery.

An initialization backup for the virtual machine is a full backup, in a backup process after the initialization backup, it needs to store only a data block that differs in an updated original volume of this time and an updated original volume of the last time, because only a small amount of differentiated data is copied during the backup, an incremental backup is implemented, thereby greatly saving disk space and improving backup efficiency and accuracy.

In this embodiment, the method may further include:

Step 61: The backup server mounts a new storage volume created by the primary storage device to the backup server, acquires the first checking table and a second checking table from the snapshot resource pool, acquires an original data block corresponding to a check value that is the same in the second checking table and the first checking table from the initialization backup volume, acquires a second updated data block from the snapshot resource pool, and forms second backup data from the acquired original data block and the acquired second updated data block.

Step 71: The backup server acquires a $j^{th}$ difference checking table and a $j^{th}$ updated data block from the snapshot resource pool, updates $(j-1)^{th}$ backup data according to the $j^{th}$ difference checking table and the $j^{th}$ updated data block to obtain $j^{th}$ backup data, repeats this step till $J^{th}$ backup data is obtained, and recovers the $J^{th}$ backup data into the new storage volume, so that the primary storage device is recovered to a $J^{th}$ updated state, where J is an integer, $2<J\leq S$, j is an integer, and $2<j\leq J$.

Specifically, after the primary storage device is faulty or data is lost, data recovery may be performed on the primary storage device through the backup storage device. A user may select a backup point (for example, the $J^{th}$ backup) to perform data recovery on the primary storage device, or may perform data recovery on the primary storage device according to data of a last backup (that is, an $S^{th}$ backup) by default. The snapshot resource pool stores a checking table of each updated original volume, a difference checking table that is used to record a difference between a checking table of a current updated original volume and a checking table of an updated original volume of the last time, and a data block that differs in the current updated original volume and the updated original volume of the last time. Therefore, when data recovery is performed on the primary storage device through data in the backup storage device, if data on the primary storage device is recovered to complete data of a certain backup point, all checking tables before the backup point need to be combined one by one. If the primary storage device is faulty or data is lost after a first backup, a data block in the initialization backup volume may directly be recovered to the primary storage device. If the primary storage device is faulty or data is lost and data recovery needs to be performed after a second backup, the data recovery may be implemented according to the method provided in this embodiment. For example, the number of times of backing up the primary storage device is J, and time of backup points is T1, T2, . . . , and TJ. If data at the TJ time point needs to be recovered, complete backup data at the T1 time point and data that differs at the T2 time point and the T1 time point need to be combined to obtain complete data at the T2 time point, and then the complete data at the T2 time point and data that differs at the T3 time point and the T2 time point are combined to obtain complete data at the T3 time point. By analogy, complete data at the TJ time point can be obtained.

In this embodiment, further, the method may further include:

Step 80: If the backup server detects that the snapshot resource pool is full, the backup server increases capacity of the snapshot resource pool according to a preset capacity expansion rule.

Specifically, when the snapshot resource pool is created, the snapshot resource pool may be allocated relatively small capacity to avoid a waste of a resource. After multiple backups, if the capacity of the snapshot resource pool is insufficient, the capacity of the snapshot resource pool may be automatically expanded to adapt to a backup requirement and improve reliability of the backup.

In this embodiment, after the backup server backs up an original data block of the original volume to the initialization backup volume in step 20, the method further includes:

unmounting, by the backup server, the snapshot initial volume.

Specifically, after each backup, the backup server may unmount a snapshot volume of this time to avoid resource occupation due to excessive snapshot volumes that are mounted on the backup server.

In this embodiment, preferably, the first checking table is a message-digest algorithm MD5 checking table.

Figure 4:
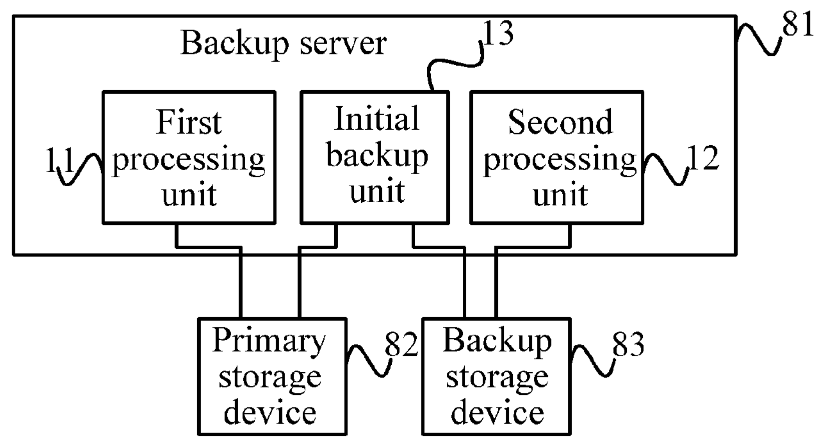
FIG. 4 is a schematic structural diagram of a first backup server according to an embodiment of the present disclosure.

FIG. 4 is a schematic structural diagram of a first backup server according to an embodiment of the present disclosure. As shown in FIG. 4, a backup server 81 provided in this embodiment may specifically implement each step of the backing up method for a virtual machine provided in any one of the embodiments of the present disclosure, and a specific implementation process is not described herein again. The backup server 81 provided in this embodiment specifically includes a first processing unit 11, a second processing unit 12, and an initial backup unit 13. The first processing unit 11 is configured to mount a snapshot initial volume of a to-be-backed-up original volume of a virtual machine in a primary storage device 82 to the backup server 81. The second processing unit 12 is configured to create an initialization backup volume on a backup storage device 83, and mounts the initialization backup volume to the backup server 81. The initial backup unit 13 is configured to back up an original data block of the original volume to the initialization backup volume.

With the backup server 81 provided in this embodiment, a first processing unit 11 mounts a snapshot initial volume of a to-be-backed-up original volume of a virtual machine in a primary storage device 82 to the backup server 81; a second processing unit 12 creates an initialization backup volume on a backup storage device 83, and mounts the initialization backup volume to the backup server 81, and an initial backup unit 13 backs up an original data block of the original volume to the initialization backup volume. Backup processing for a virtual machine is implemented by the backup server 81, thereby reducing occupation of a virtualization platform resource including primary storage in a backup process, saving space of a backup disk, and improving backup efficiency of the virtual machine at the same time.

Figure 5:
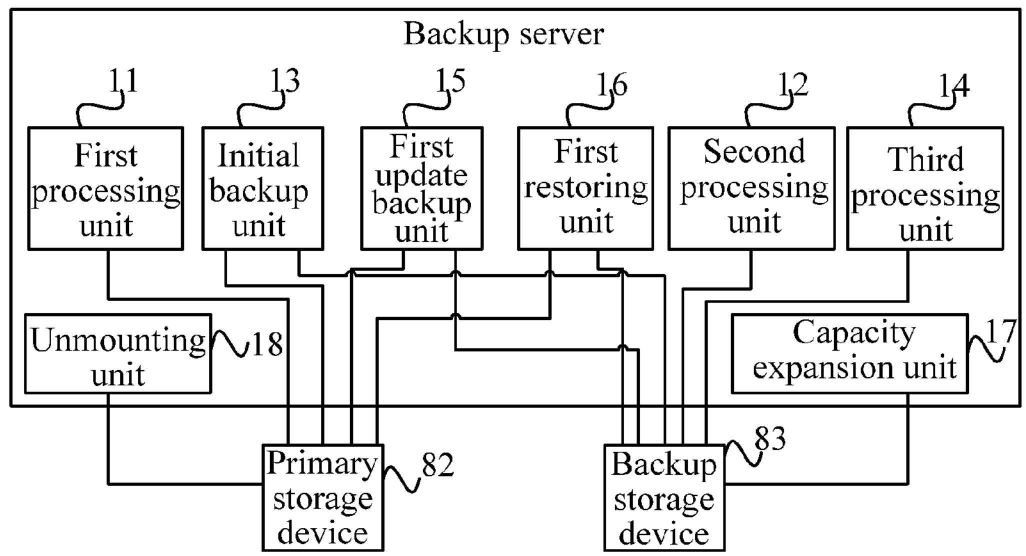
FIG. 5 is a schematic structural diagram of a second backup server according to an embodiment of the present disclosure.

FIG. 5 is a schematic structural diagram of a second backup server according to an embodiment of the present disclosure. As shown in FIG. 5, in this embodiment, the backup server 81 may further include a third processing unit 14 and a first update backup unit 15. The third processing unit 14 is configured to create a snapshot resource pool on the backup storage device 83, mount the snapshot resource pool to the backup server 81, acquire a first checking table of the snapshot initial volume, and store the first checking table into the snapshot resource pool, where the first checking table is used to record a check value of each original data block in the original volume. The first update backup unit 15 is configured to mount a snapshot volume of an $N^{th}$ updated original volume to the backup server 81, acquire an $N^{th}$ checking table of the snapshot volume of the $N^{th}$ updated original volume, compare the $N^{th}$ checking table with the first checking table to obtain an $N^{th}$ difference checking table, acquire an $N^{th}$ updated data block corresponding to the $N^{th}$ difference checking table from the $N^{th}$ updated original volume, and store the $N^{th}$ checking table, the $N^{th}$ difference checking table, and the $N^{th}$ updated data block into the snapshot resource pool to complete an $N^{th}$ backup, where N is an integer and N>1, the $N^{th}$ checking table is used to record a check value of each data block in the $N^{th}$ updated original volume, and the $N^{th}$ difference checking table is used to record a check value that differs in the $N^{th}$ checking table and the first checking table.

An initialization backup for the virtual machine is a full backup, in a backup process after the initialization backup, it needs to store only a data block that differs in a current updated original volume and an original volume during initialization, and because only differentiated data is copied during the backup, an incremental backup is implemented, thereby greatly saving disk space and improving backup efficiency and accuracy.

In this embodiment, the backup server 81 may further include a first recovering unit 16. The first recovering unit 16 is configured to mount a new storage volume created by the primary storage device 82 to the backup server 81, acquire an $M^{th}$ checking table of an $M^{th}$ backup and the first checking table from the snapshot resource pool, acquire an original data block corresponding to a check value that is the same in the $M^{th}$ checking table and the first checking table from the initialization backup volume, acquire an $M^{th}$ updated data block from the snapshot resource pool, and recover the acquired original data block and the acquired $M^{th}$ updated data block into the new storage volume, so that the primary storage device is recovered to an $M^{th}$ updated state, where M is an integer and $1<M\leq N$.

Specifically, after the primary storage device 82 is faulty or data is lost, data recovery may be performed on the primary storage device 82 through the backup storage device 83. A user may select a backup point (for example, the $M^{th}$ backup) to perform data recovery on the primary storage device 82, or may perform data recovery on the primary storage device 82 according to data of a last backup (that is, the $N^{th}$ backup) by default. Because the original data block is stored in the initialization backup volume of the backup storage device 83, and each updated checking table and each updated data block that is different from the original data block are stored in the snapshot resource pool, data recovery may be perform on the primary storage device 82 according to the initialization backup volume and the snapshot resource pool.

In this embodiment, the backup server 81 may further include a capacity expansion unit 17. The capacity expansion unit 17 is configured to increase capacity of the snapshot resource pool according to a preset capacity expansion rule if it is detected that the snapshot resource pool is full. The capacity of the snapshot resource pool may be automatically expanded by setting the capacity expansion unit 17, so as to adapt to a backup requirement and improve reliability of the backup.

In this embodiment, the backup server 81 may further include an unmounting unit 18, where the unmounting unit 18 is configured to unmount the snapshot initial volume. After each backup, a current snapshot volume may be unmounted through the unmounting unit 18, so as to avoid resource occupation due to excessive snapshot volumes that are mounted on the backup server 81.

Figure 6:
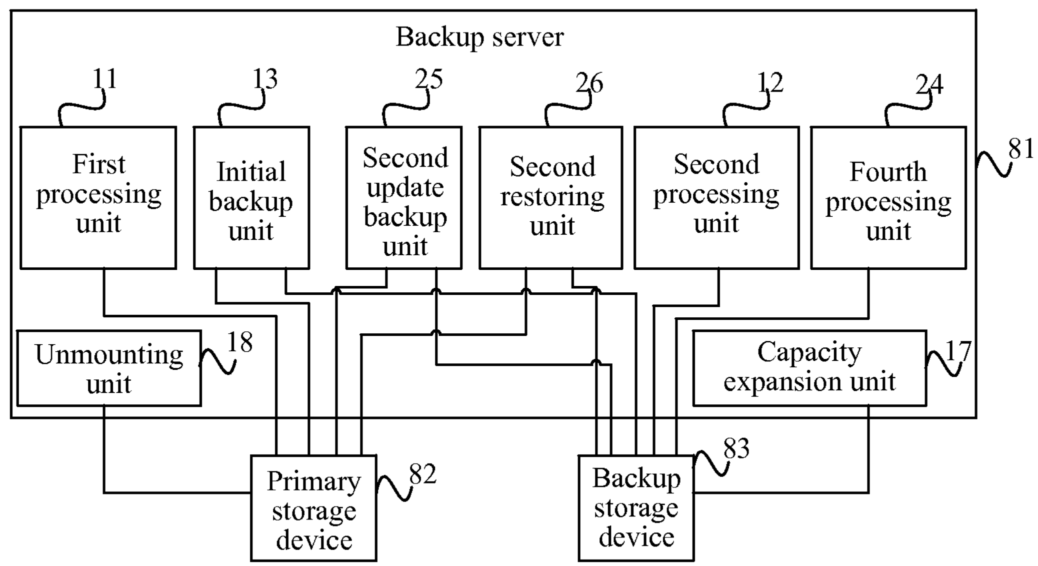
FIG. 6 is a schematic structural diagram of a third backup server according to an embodiment of the present disclosure.

FIG. 6 is a schematic structural diagram of a third backup server according to an embodiment of the present disclosure. As shown in FIG. 6, in this embodiment, the backup server 81 may further include a fourth processing unit 24 and a second update backup unit 25. The fourth processing unit 24 is configured to create a snapshot resource pool on the backup storage device 83, mount the snapshot resource pool to the backup server 81, acquire a first checking table of the snapshot initial volume, and store the first checking table into the snapshot resource pool, where the first checking table is used to record a check value of each original data block in the original volume. The second update backup unit 25 is configured to mount a snapshot volume of an $I^{th}$ updated original volume to the backup server 81, acquire an $I^{th}$ checking table of the snapshot volume of the $I^{th}$ updated original volume, compare the $I^{th}$ checking table with an $(I-1)^{th}$ checking table to obtain an $I^{th}$ difference checking table, acquire an $I^{th}$ updated data block corresponding to the $I^{th}$ difference checking table from the $I^{th}$ updated original volume, and store the $I^{th}$ checking table, the $I^{th}$ difference checking table, and the $I^{th}$ updated data block into the snapshot resource pool to complete an $I^{th}$ backup, where I is an integer and I>1, the $I^{th}$ checking table is used to record a check value of each data block in the $I^{th}$ updated original volume, and the $I^{th}$ difference checking table is used to record a check value that differs in the $I^{th}$ checking table and the $(I-1)^{th}$ checking table.

An initialization backup for the virtual machine is a full backup, in a backup process after the initialization backup, it needs to store only a data block that differs in a current updated original volume and an updated original volume of the last time, because only a small amount of differentiated data is copied during the backup, an incremental backup is implemented, thereby greatly saving disk space and improving backup efficiency and accuracy.

In this embodiment, the backup server 81 may further include a second recovering unit 26. The second recovering unit 26 is configured to mount a new storage volume created by the primary storage device 82 to the backup server 81, acquire the first checking table and a second checking table from the snapshot resource pool, acquire an original data block corresponding to a check value that is the same in the second checking table and the first checking table from the initialization backup volume, acquire a second updated data block from the snapshot resource pool, and form second backup data from the acquired original data block and the acquired second updated data block; and acquire a $j^{th}$ difference checking table and a $j^{th}$ updated data block from the snapshot resource pool, update $(j-1)^{th}$ backup data according to the $j^{th}$ difference checking table and the $j^{th}$ updated data block to obtain $j^{th}$ backup data, repeat this step till $J^{th}$ backup data is obtained, and recover the $J^{th}$ backup data into the new storage volume, so that the primary storage device 82 is recovered to a $J^{th}$ updated state, where J is an integer, 2<J≤S, j is an integer, and 2<j≤J.

Specifically, after the primary storage device 82 is faulty or data is lost, data recovery may be performed on the primary storage device 82 through the backup storage device 83. A user may select a backup point (for example, the $J^{th}$ backup) to perform data recovery on the primary storage device 82, or may perform data recovery on the primary storage device 82 according to data of a last backup (that is, an $S^{th}$ backup) by default. The snapshot resource pool stores a checking table of each updated original volume, a difference checking table that is used to record a difference between a checking table of a current updated original volume and a checking table of an updated original volume of the last time, and a data block that differs in the current updated original volume and the updated original volume of the last time. Therefore, when data recovery is performed on the primary storage device 82 through data in the backup storage device, if data on the primary storage device 82 is recovered to complete data of a certain backup point, all checking tables before the backup point need to be combined one by one. If the primary storage device 82 is faulty or data is lost after a first backup, a data block in the initialization backup volume may directly be recovered to the primary storage device 82. If the primary storage device is faulty or data is lost and data recovery needs to be performed after a second backup, the data recovery may be implemented according to the method provided in this embodiment. For example, the number of times of backing up the primary storage device 82 is J, and time of backup points is T1, T2, . . . , and TJ. If data at the TJ time point needs to be recovered, complete backup data at the T1 time point and data that differs at the T2 time point and the T1 time point need to be combined to obtain complete data at the T2 time point, and then the complete data at the T2 time point and data that differs at the T3 time point and the T2 time point are combined to obtain complete data at the T3 time point. By analogy, complete data at the TJ time point can be obtained.

In this embodiment, the backup server 81 may further include a capacity expansion unit 17. The capacity expansion unit 17 is configured to increase capacity of the snapshot resource pool according to a preset capacity expansion rule if it is detected that the snapshot resource pool is full. The capacity of the snapshot resource pool may be automatically expanded by setting the capacity expansion unit 17, so as to adapt to a backup requirement and improve reliability of the backup.

In this embodiment, the backup server 81 may further include an unmounting unit 18, where the unmounting unit 18 is configured to unmount the snapshot initial volume. After each backup, a current snapshot volume may be unmounted through the unmounting unit 18, so as to avoid resource occupation due to excessive snapshot volumes that are mounted on the backup server 81.

Figure 7:
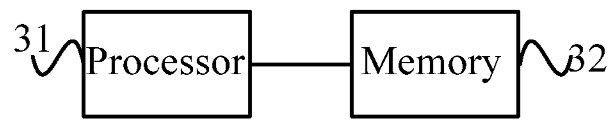
FIG. 7 is a schematic structural diagram of a fourth backup server according to an embodiment of the present disclosure.

FIG. 7 is a schematic structural diagram of a fourth backup server according to an embodiment of the present disclosure. As shown in FIG. 7, a backup server provided in this embodiment may specifically implement each step of the backing up method for a virtual machine provided in any one of the embodiments of the present disclosure, and a specific implementation process is not described herein again. The backup server provided in this embodiment specifically includes a processor 31 and a memory 32, where the memory 32 is configured to store an instruction. The processor 31 is coupled to the memory 32. The processor 31 is configured to perform the instruction stored in the memory 32, and the processor 31 is configured to mount a snapshot initial volume of a to-be-backed-up original volume of a virtual machine in a primary storage device to the backup server, create an initialization backup volume on a backup storage device, mount the initialization backup volume to the backup server, and back up an original data block of the original volume to the initialization backup volume.

Figure 8:
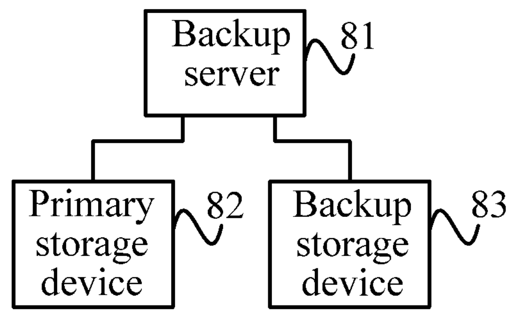
FIG. 8 is a schematic structural diagram of a backing up system for a virtual machine according to an embodiment of the present disclosure.

FIG. 8 is a schematic structural diagram of a backing up system for a virtual machine according to an embodiment of the present disclosure. As shown in FIG. 8, the backing up system for a virtual machine provided in this embodiment may specifically implement each step of the backing up method for a virtual machine provided in any one of the embodiments of the present disclosure, and a specific implementation process is not described herein again. The backing up system for a virtual machine provided in this embodiment specifically includes a primary storage device 82 and a backup storage device 83, and further includes the backup server 81 provided in any one of the embodiments of the present disclosure.

With the backing up method, device, and system for a virtual machine provided in the embodiments of the present disclosure, a backup process for a virtual machine does not require participation of a virtualization platform and is mainly implemented by using a resource of a backup server, and only a few query operations are performed on a primary storage device. This basically has no impact on performance of the virtualization platform (including the virtual machine) and performance of the primary storage device. Moreover, a backup is implemented by using a backup server, manufacturers and brands of the backup server and the primary storage device may be completely different, and heterogeneous storage such as IP (Internet Protocol, Internet protocol), SAN (Storage Area Network, storage area network), FC (Fiber Channel, fiber channel), SAN or NAS (Network Storage Technologies, network storage technologies) is supported. In a backup process, the backup server ensures backup integrity, consistency, and timeliness for data by using a snapshot function of the primary storage device, acquires a checking table of a single snapshot by cooperating with storage, especially an MD5 checking table, acquires valid data of the snapshot according to the MD5 checking table to perform a compact full backup, acquires a difference MD5 checking table between two snapshots, and acquires snapshot difference data according to the difference MD5 checking table to perform an incremental backup or a differential backup. No matter whether the full backup or the incremental backup is performed, only a small amount of differentiated data is backed up, thereby saving disk space and improving backup efficiency at the same time. The backup server may perform a backup service for multiple primary storage devices simultaneously, and the implementation is simple because only a storage volume of a primary server needs to be mounted to the backup server. In addition, it should be noted that the backing up method, device, and system provided in the embodiments of the present disclosure are introduced by using an application scenario of a backup for a virtual machine of a virtualization platform as an example, and persons skilled in the art may also apply the backing up method, device, and system for a virtual machine to a backing up process of a physical machine, which is not limited in this embodiment.

Persons of ordinary skill in the art may understand that all or a part of the steps of the foregoing method embodiments may be implemented by a program instructing relevant hardware. The foregoing program may be stored in a computer readable storage medium. When the program runs, the steps of the foregoing method embodiments are performed. The foregoing storage medium includes various mediums capable of storing program codes, such as a ROM, a RAM, a magnetic disk, or an optical disk.

Finally, it should be noted that the foregoing embodiments are merely intended for describing the technical solutions of the present disclosure rather than limiting the present disclosure. Although the present disclosure is described in detail with reference to the foregoing embodiments, persons of ordinary skill in the art should understand that they may still make modifications to the technical solutions described in the foregoing embodiments, or make equivalent replacements to some technical features thereof; however, these modifications or replacements do not make the essence of corresponding technical solutions depart from the scope of the technical solutions in the embodiments of the present disclosure.

What is claimed is:

1. A backing up method for a virtual machine, the method comprising:

mounting, by a backup server, a snapshot initial volume of an original volume of a virtual machine in a primary storage device to the backup server;

creating, by the backup server, an initialization backup volume on a backup storage device, and mounting the initialization backup volume to the backup server; and backing up, by the backup server, an original data block of the original volume to the initialization backup volume;

after the mounting, creating, by the backup server, a snapshot resource pool on the backup storage device, mounting the snapshot resource pool to the backup server, acquiring a first checking table of the snapshot initial volume, and storing the first checking table into the snapshot resource pool, wherein the first checking table is used to record a check value of each original data block in the original volume; and after the backing up, mounting, by the backup server, a snapshot volume of an $N^{th}$ updated original volume to the backup server, acquiring an $N^{th}$ checking table of the snapshot volume of the $N^{th}$ updated original volume, comparing the $N^{th}$ checking table with the first checking table to obtain an $N^{th}$ difference checking table, acquiring an $N^{th}$ updated data block corresponding to the $N^{th}$ difference checking table from the $N^{th}$ updated original volume, and storing the $N^{th}$ checking table, the $N^{th}$ difference checking table, and the $N^{th}$ updated data block into the snapshot resource pool to complete an $N^{th}$ backup, wherein N is an integer and N>1, the $N^{th}$ checking table is used to record a check value of each data block in the $N^{th}$ updated original volume, and the $N^{th}$ difference checking table is used to record a check value that differs in the $N^{th}$ checking table and the first checking table.

2. The backing up method according to claim 1, further comprising:

mounting, by the backup server, a new storage volume created by the primary storage device to the backup server, acquiring an $M^{th}$ checking table of an $M^{th}$ backup and the first checking table from the snapshot resource pool, acquiring an original data block corresponding to a check value that is the same in the $M^{th}$ checking table and in the first checking table from the initialization backup volume, acquiring an $M^{th}$ updated data block from the snapshot resource pool, and recovering the acquired original data block and the acquired $M^{th}$ updated data block into the new storage volume, so that the primary storage device is recovered to an $M^{th}$ updated state, wherein M is an integer and $1<M\leq N$.

3. The backing up method according to claim 1, further comprising:

increasing capacity of the snapshot resource pool according to a preset capacity expansion rule when the backup server detects that the snapshot resource pool is full.

4. The backing up method according to claim 1, wherein the first checking table is a message-digest algorithm MD5 checking table.

5. The backing up method according to claim 1, further comprising:

after the backing up, mounting, by the backup server, a snapshot volume of an $I^{th}$ updated original volume to the backup server, acquiring an $I^{th}$ checking table of the snapshot volume of the $I^{th}$ updated original volume, comparing the $I^{th}$ checking table with an $(I-1)^{th}$ checking table to obtain an $I^{th}$ difference checking table, acquiring an $I^{th}$ updated data block corresponding to the $I^{th}$ difference checking table from the $I^{th}$ updated original volume, and storing the $I^{th}$ checking table, the $I^{th}$ difference checking table, and the $I^{th}$ updated data block into the snapshot resource pool to complete an $I^{th}$ backup, wherein I is an integer and I>1, the $I^{th}$ checking table is used to record a check value of each data block in the $I^{th}$ updated original volume, and the $I^{th}$ difference checking table is used to record a check value that differs in the $I^{th}$ checking table and the $(I-1)^{th}$ checking table.

6. The backing up method according to claim 5, further comprising:

mounting, by the backup server, a new storage volume created by the primary storage device to the backup server, acquiring the first checking table and a second checking table from the snapshot resource pool, acquiring an original data block corresponding to a check value that is the same in the second checking table and in the first checking table from the initialization backup volume, acquiring a second updated data block from the snapshot resource pool, and forming second backup data from the acquired original data block and the acquired second updated data block; and acquiring, by the backup server, a $j^{th}$ difference checking table and a $j^{th}$ updated data block from the snapshot resource pool, updating $(j-1)^{th}$ backup data according to the $j^{th}$ difference checking table and the $j^{th}$ updated data block to obtain $j^{th}$ backup data, repeating this step till $J^{th}$ backup data is obtained, and recovering the $J^{th}$ backup data into the new storage volume, so that the primary storage device is recovered to a $J^{th}$ updated state, wherein J is an integer, $2<J\leq S$, j is an integer, and $2<j\leq J$.

7. The backing up method according to claim 1, further comprising, after the backing up, unmounting, by the backup server, the snapshot initial volume.

8. A backup server comprising:

a first processing unit, configured to mount a snapshot initial volume of an original volume of a virtual machine in a primary storage device to the backup server;

a second processing unit, configured to create an initialization backup volume on a backup storage device, and mount the initialization backup volume to the backup server; and an initial backup unit, configured to back up an original data block of the original volume to the initialization backup volume;

a third processing unit, configured to create a snapshot resource pool on the backup storage device, mount the snapshot resource pool to the backup server, acquire a first checking table of the snapshot initial volume, and store the first checking table into the snapshot resource pool, wherein the first checking table is used to record a check value of each original data block in the original volume; and a first update backup unit, configured to mount a snapshot volume of an $N^{th}$ updated original volume to the backup server, acquire an $N^{th}$ checking table of the snapshot volume of the $N^{th}$ updated original volume, compare the $N^{th}$ checking table with the first checking table to obtain an $N^{th}$ difference checking table, acquire an $N^{th}$ updated data block corresponding to the $N^{th}$ difference checking table from the $N^{th}$ updated original volume, and store the $N^{th}$ checking table, the $N^{th}$ difference checking table, and the $N^{th}$ updated data block into the snapshot resource pool to complete an $N^{th}$ backup, wherein N is an integer and N>1, the $N^{th}$ checking table is used to record a check value of each data block in the $N^{th}$ updated original volume, and the $N^{th}$ difference checking table is used to record a check value that differs in the $N^{th}$ checking table and the first checking table.

9. The backup server according to claim 8, further comprising:

a first recovering unit, configured to mount a new storage volume created by the primary storage device to the backup server, acquire an $M^{th}$ checking table of an $M^{th}$ backup and the first checking table from the snapshot resource pool, acquire an original data block corresponding to a check value that is the same in the $M^{th}$ checking table and in the first checking table from the initialization backup volume, acquire an $M^{th}$ updated data block from the snapshot resource pool, and recover the acquired original data block and the acquired $M^{th}$ updated data block into the new storage volume, so that the primary storage device is recovered to an $M^{th}$ updated state, wherein M is an integer and $1<M\leq N$.

10. The backup server according to claim 8, further comprising:

a fourth processing unit, configured to create a snapshot resource pool on the backup storage device, mount the snapshot resource pool to the backup server, acquire a first checking table of the snapshot initial volume, and store the first checking table into the snapshot resource pool, wherein the first checking table is used to record a check value of each original data block in the original volume; and a second update backup unit, configured to mount a snapshot volume of an $I^{th}$ updated original volume to the backup server, acquire an $I^{th}$ checking table of the snapshot volume of the $I^{th}$ updated original volume, compare the $I^{th}$ checking table with an $(I-1)^{th}$ checking table to obtain an $I^{th}$ difference checking table, acquire an $I^{th}$ updated data block corresponding to the $I^{th}$ difference checking table from the $I^{th}$ updated original volume, and store the $I^{th}$ checking table, the $I^{th}$ difference checking table, and the $I^{th}$ updated data block into the snapshot resource pool to complete an $I^{th}$ backup, wherein I is an integer and I>1, the $I^{th}$ checking table is used to record a check value of each data block in the $I^{th}$ updated original volume, and the $I^{th}$ difference checking table is used to record a check value that differs in the $I^{th}$ checking table and the $(I-1)^{th}$ checking table.

11. The backup server according to claim 10, further comprising:

a second recovering unit, configured to mount a new storage volume created by the primary storage device to the backup server, acquire the first checking table and a second checking table from the snapshot resource pool, acquire an original data block corresponding to a check value that is the same in the second checking table and in the first checking table from the initialization backup volume, acquire a second updated data block from the snapshot resource pool, and form second backup data from the acquired original data block and the acquired second updated data block; and acquire a $j^{th}$ difference checking table and a $j^{th}$ updated data block from the snapshot resource pool, update $(j-1)^{th}$ backup data according to the $j^{th}$ difference checking table and the $j^{th}$ updated data block to obtain $j^{th}$ backup data, repeat this step till $J^{th}$ backup data is obtained, and recover the $J^{th}$ backup data into the new storage volume, so that the primary storage device is recovered to a $J^{th}$ updated state, wherein J is an integer, $2<J\leq S$, j is an integer, and $2<j\leq J$.

12. The backup server according to claim 11, further comprising:

a capacity expansion unit, configured to increase capacity of the snapshot resource pool according to a preset capacity expansion rule when it is detected that the snapshot resource pool is full.

13. The backup server according to claim 8, further comprising an unmounting unit, configured to unmount the snapshot initial volume.

14. A backing up system for a virtual machine, comprising:

a primary storage device;

a backup storage device; and a backup server, the backup server configured to:

mount a snapshot initial volume of an original volume of a virtual machine in the primary storage device to the backup server;

create an initialization backup volume on the backup storage device, and mount the initialization backup volume to the backup server;

back up an original data block of the original volume to the initialization backup volume;

after the mounting, create a snapshot resource pool on the backup storage device, mount the snapshot resource pool to the backup server, acquire a first checking table of the snapshot initial volume, and store the first checking table into the snapshot resource pool, wherein the first checking table is used to record a check value of each original data block in the original volume; and after the backing up, mount a snapshot volume of an $N^{th}$ updated original volume to the backup server, acquire an $N^{th}$ checking table of the snapshot volume of the $N^{th}$ updated original volume, compare the $N^{th}$ checking table with the first checking table to obtain an $N^{th}$ difference checking table, acquire an $N^{th}$ updated data block corresponding to the $N^{th}$ difference checking table from the $N^{th}$ updated original volume, and store the $N^{th}$ checking table, the $N^{th}$ difference checking table, and the $N^{th}$ updated data block into the snapshot resource pool to complete an $N^{th}$ backup, wherein N is an integer and N>1, the $N^{th}$ checking table is used to record a check value of each data block in the $N^{th}$ updated original volume, and the $N^{th}$ difference checking table is used to record a check value that differs in the $N^{th}$ checking table and the first checking table.

* * * * *